Nov. 22, 1966    F. T. CHAMBERS III, ET AL    3,287,720
RESONANT REED MOTION DETECTOR
Filed Sept. 12, 1963
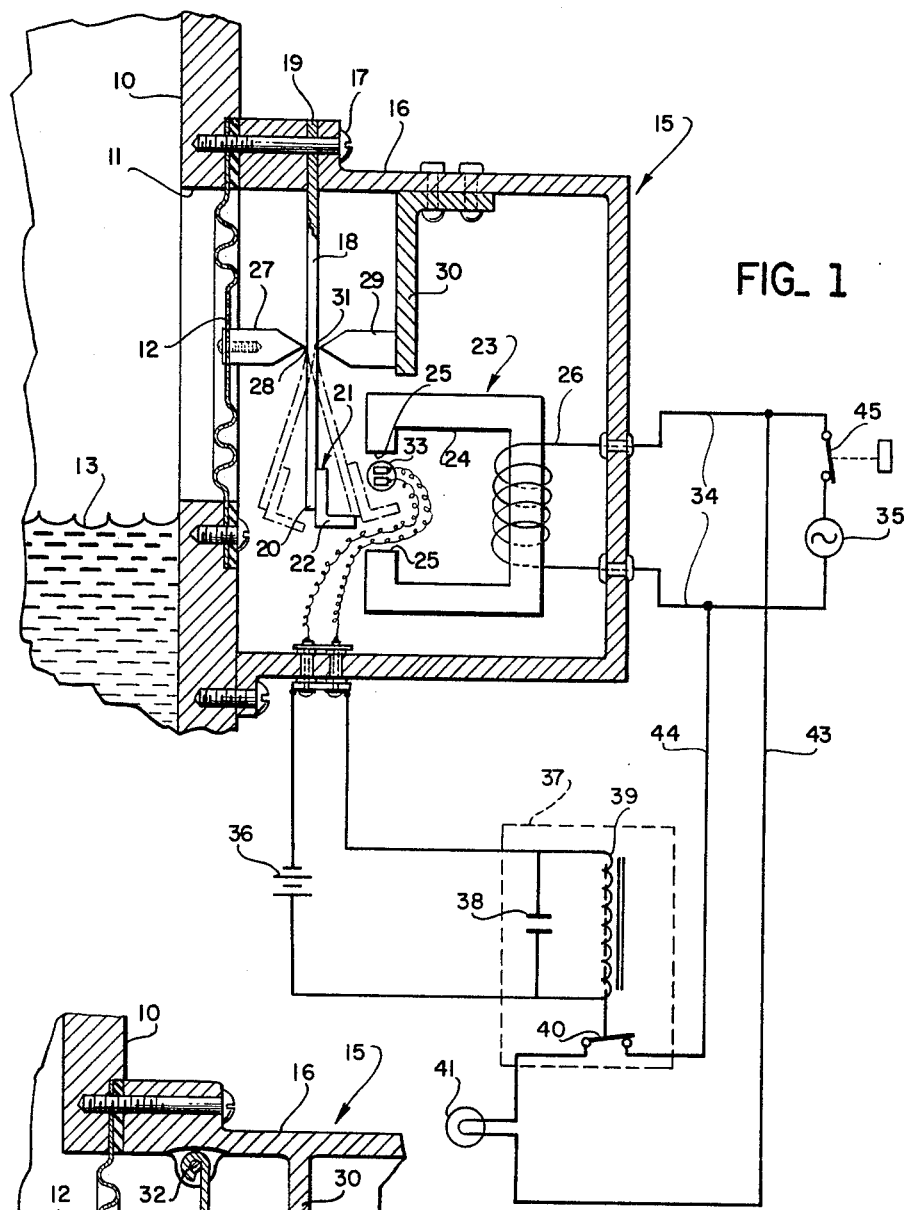
FIG_1
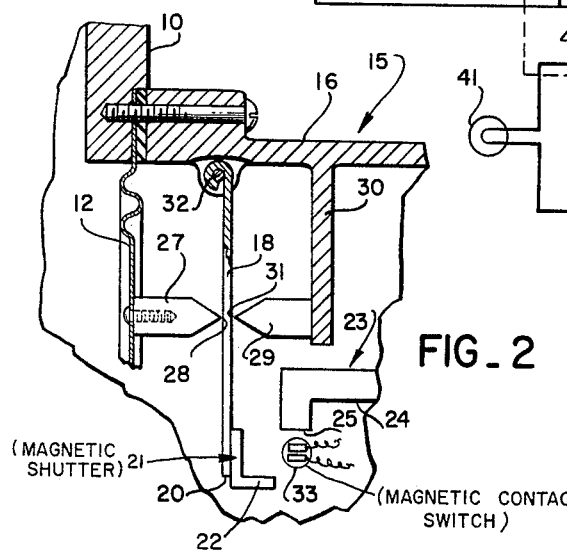
FIG_2
(MAGNETIC SHUTTER) 21
(MAGNETIC CONTACT SWITCH)
INVENTORS
FRANCIS T. CHAMBERS III
EDWARD S. KINNEY
By George C. Sullivan
Agent

United States Patent Office 3,287,720
Patented Nov. 22, 1966

3,287,720
RESONANT REED MOTION DETECTOR
Francis T. Chambers III, Princeton, and Edward S. Kinney, Westfield, N.J., assignors to Lockheed Aircraft Corporation, Burbank, Calif.
Filed Sept. 12, 1963, Ser. No. 308,544
7 Claims. (Cl. 340—248)

This invention relates generally to motion detectors and more particularly to a vibrating reed motion detector especially suited for sensing small motions such as, for example, that of pressure-sensitive diaphragms.

The motion detector in its preferred arrangement employs a magnetic switch of the normally open type. The switch is intermittently closed by a magnetic flux generated with an electromagnet unless the flux is shunted by the periodic excursions of a vibrating reed when tuned to resonate at twice the line frequency of the alternating current source driving the electromagnet. The motion to be detected is utilized to change the tuning of the reed and thereby control the switching action to perform the detection function.

In the automation of petroleum production, refining and distribution processes, as in all process industries, there is a need for simple, reliable, rugged devices to provide electrical indication of level limits in storage tanks, bins, etc. for liquid and granular products. The device described herein is primarily intended for such applications however, the concept involved can easily be extended to detect any phenomenon which can be translated into a small mechanical movement and where minimum energy is available from the phenomenon. The invention, for example, may be readily applied to such devices as differential pressure detectors and altitude limit switches.

Techniques now in use for fixed point liquid and solid level detection are numerous; however, most are not suitable to providing an electrical indication of level limits. Those which are, such as represented by Findlay Patent 2,808,581, require that the detection element be immersed in the fluid and otherwise suffer from complexity such as requiring separate detection and excitation windings.

An object of this invention is to provide a motion detector having high sensitivity and positive switch action through motion amplification.

It is another object of this invention to provide a motion detector which, when used in combination with a pressure-sensitive diaphragm, will serve as a level detector for fluid or granular material in containers and provide an electrical indication of the level wherein the detector components and related circuitry are entirely external to the container.

It is another object of this invention to provide a motion detector which may be made insensitive to high overloads.

Another object of this invention is to provide a motion detector requiring few parts which may be readily assembled and adjusted for reliable operation in even the most rugged environments.

Still another object of this invention is to provide a motion detector, the operation of which can be validated remotely in either the "on" or "off" states and is failsafe.

Further and other objects of this invention will become apparent from a reading of the following detailed description, especially when considered in combination with the accompanying drawing wherein like numerals refer to like parts.

In the drawing:

FIGURE 1 is a fragmentary sectional side view showing the motion detector of this invention in its preferred form as used in combination with a pressure-sensitive diaphragm for the detection of fluid levels in a container.

FIGURE 2 is a fragmentary sectional side view showing a modification of the FIGURE 1 device.

Referring to FIGURE 1, wall 10 of a fluid container is provided with an opening 11 in which is mounted a flexible diaphragm 12. When the level of fluid 13 inside the container rises to the level of the diphragm, the pressure exerted by the fluid on the diaphragm causes the latter to move outwardly in response to the applied pressure. The motion detector described herein senses this motion of diaphragm 12 to provide an indication of the level of the fluid in the novel manner hereinafter described wherein the diaphragm motion is amplified by a tuned reed 18 to operate a magnetic switch 33.

Motion detector 15 includes a frame or housing 16 suitably secured to wall 10 of a fluid container over diaphragm 12 on the external side thereof. A flexible reed 18, which may or may not itself be a magnetic material, is carried at one end 19 by frame 16 to extend in generally spaced parallel relationship across the face of diaphragm 12. To the free end 20 of reed 18 is mounted a magnetic shutter 21. One leg 22 of magnetic shutter 21 may, for example, project generally transversely of the reed in the direction of an electromagnet 23. Core 24 of the electromagnet is provided with a flux gap 25 such that when the electromagnet is excited by an alternating current signal applied to coil 26, magnetic flux will flow across the gap unless shunted by the insertion of shutter 21.

A detent 27, preferably of the knife-edge type shown, is secured to diaphragm 12 to project outwardly of the container so that its tip portion 28 terminates just short of reed 18 in the neutral postion of the diaphragm. Diaphragm motion in response to the application of pressure by fluid within the container causes detent 27 to engage reed 18 intermediate the ends thereof and thereby change the resonant frequency of the reed. To prevent damaging diaphragm 12 and motion detector 15 as a result of high overload pressures inside the container, a second detent 29 may be suitably rigidly mounted on frame 16 such as by bracket 30 in opposed alignment with detent 27 on the opposite side of reed 18. Detent 29 is likewise preferably of the knife-edge type shown wherein its tip portion 31 in the neutral position of diaphragm 12 is closely spaced from reed 18 so as to actually physically contact the reed only when the reed is forced in its direction by movement of diaphragm 12 and its associated detent 27.

While reed 18 is shown cantilevered from frame 16 in FIGURE 1, it may be supported from the one end by any suitable means including a hinge connection 32 as illustrated in FIGURE 2.

A magnetic switch 33, preferably of the normally open encapsulated reed type is suitably mounted (mounting not shown) in gap 25 of electromagnet 23 so as to be closed by a flux of either polarity flowing across the gap. Coil 26 of electromagnet 23 is coupled through lines 34 to a suitable source 35 of alternating current which may be a standard commercial 110–120 volt, 60-cycle supply. Hence, the flux across gap 25 is alternately of positive and negative polarity, causing switch 33 to close at twice the line frequency so long as the flux is not shunted by insertion of magnetic shutter 21.

By tuning reed 18 to resonate at twice the line frequency (this may by design be either when the reed is free or when constrained by detent 27) the free end of the reed will build up to a maximum excursion due to the flux from the electromagnet wherein magnetic shutter 21 will be periodically inserted in gap 25 during each half cycle of the line frequency preventing actuation of magnetic switch 33. When reed 18 is detuned or not tuned to the line frequency but to a different frequency, preferably substantially removed from the line frequency, it will not respond to the forces of the electromagnet and therefore will not vibrate to insert magnetic shutter 21 into the flux path and interrupt the intermittent closing of switch 33. These two operating conditions, i.e., intermittent opening and closing of switch 33 at twice line frequency or isolation of the switch to hold the same in its normally open condition performs the detection function for sensing movement of diaphragm 12.

Magnetic switch 33 is shown coupled in series with battery 36 and a holding relay 37. Capacitor 38 is parallel with coil 39 of the holding relay causes relay contact 40 to remain closed while magnetic switch 33 is intermittently actuated. When magnetic switch 33 opens and remains open for a period exceeding the time constant of the holding relay 37, its contact 40 will open.

The electrical output of the motion detector in controlling the holding relay causes a suitable indicator or control element 41 to be lighted or "on" when the relay contact is closed and to be "off" when the relay contact is open. The power for operating indicator 41 is obtained through leads 43 and 44 coupled to lines 34 supplying power to electromagnet 23.

For some applications the reed may be tuned to resonate, and thus cause the magnetic switch to remain open, when the reed is not constrained between detents, i.e., motion is not being detected. In the preferred arrangement, though, the reed is tuned to resonate, and thus cause the magnetic switch to remain open, when the reed is constrained between detents, i.e., motion is being detected. This has the advantage that it provides a fail-safe indication in case of power failure, breakage of electrical cable connecting switch to signaling means, or failure of switch in the open position; i.e., the indication given in case of the listed failures is the same as the indication given when the desired motion is being detected. When used as a level detector, therefore, the system will indicate "high level" on the occurrence of any of the listed failures.

Holding relay 37 may obviously be eliminated and indicator 41, if a lamp, inserted directly in the magnetic switch circuit in series with battery 36, in which case one condition would be indicated by the lamp being "off" and the other condition would be indicated by the lamp blinking "off" and "on" rapidly with the intermittent opening and closing of magnetic switch 33. Holding relay 37 is employed in the preferred arrangement, however, as it provides a continuous high level signal from the motion detector; relay contact 40 preferably being closed when fluid is not pressing against the diaphragm and open when the fluid is detected or when power fails, etc.

With the holding relay 37, the unit can also be tested from a remote point by removing and applying power and checking to see whether the relay contact condition changes, as it will, regardless of the initial condition, if the time constant of the holding relay is made to be shorter than the build up time of the resonant reed. To perform this check-out function, a manually operable switch 45 is provided, as shown in FIGURE 1.

In the preferred arrangement disclosed, diaphragm 12 and its attached knife-edged detent 27 constitute in effect a pressure-sensitive switch which, on constraining reed 18 due to the application of pressure to the diaphragm, tunes the free end of the reed to resonate at twice the line frequency; the free part of the reed becoming the controlling resonant element. Thus tuned to the power frequency, the reed tip develops an amplitude of motion sufficient to block operation of the magnetic switch by the flux shunting action of shutter 21 on the end of the reed. When the diaphragm is not displaced, the free (unconstrained) reed is tuned, if at all, to some lower frequency than that of the applied line voltage and thus does not resonate.

By tuning and detuning the reed, rapid and extensive changes to either a vibrating or a static condition are obtained to provide positive actuation of switch 33. In this connection, the actual displacement of the movable knife-edge detent can be made very small, thus allowing the diaphragm to move only slightly before being detected. These features offer significant advantages in permitting the use of strong and relatively stiff diaphragms as well as in detection of extremely low level forces such as would be incapable of reliably operating a switch directly.

While the motion detector has been shown and described in a preferred configuration and as applied to detecting the level of fluid in a container, it should be recognized that the invention has application to any problem where the phenomenon to be detected can be translated into a small mechanical movement and where minimum energy is available from the phenomenon. Accordingly, it is to be understood that certain alterations, modifications and substitutions may be made to the instant disclosure without departing from the spirit and scope of the invention as defined by the appended claims.

We claim:

1. A motion detector for electrically indicating changes in pressure and the like comprising, a frame, a member movable from a neutral position relative to said frame, a first detent carried on said movable member, a second detent fixedly secured to said frame adjacent the movable member in spaced opposed alignment with said first detent, a reed supported at one end by said frame and extending through the space between the detents and adapted to be constrained therebetween only on movement of said member from a neutral position, a magnetic shutter carried on the free end of said reed and extending laterally therefrom, a source of alternating current, an electromagnet coupled to said source of atlernating current for generating a magnetic flux of alternately positive and negative polarity in a confined path, said electromagnet being arranged adjacent the free end of said reed whereby the reed only when constrained is tuned to resonate at substantially twice the alternating current frequency applied to said electromagnet to produce maximum excursion vibrations of said reed periodically inserting said shutter into the flux path of said electromagnet and shunting the flux from its confined path, and magnetic switch means located in the confined flux path to be shielded from the flux only by the shunting action of said shutter whereby actuation of said switch means indicates the position of said member relative to its neutral position.

2. A device as defined in claim 1 including a relay electrically coupled to said magnetic switch means and responsive to periodic actuation of said switch at the alternating current source frequency for closure of the relay, and an indicator circuit responsive to closure of the relay for producing a high level signal.

3. A motion detector comprising, a frame, a member movable from a neutral position relative to said frame, a reed supported at one end on said frame, at least the free end portion of said reed being magnetic, means coupled to said member and arranged to constrain said reed intermediate the ends thereof on movement of said member from the neutral position whereby the reed is tuned to one resonant frequency, a source of alternating current having a frequency substantially half said one resonant frequency of the reed, excitation coil means coupled to said source of alternating current and arranged adjacent the free end of said reed to induce oscillation thereof at said one resonant frequency, and a magnetically operated contact switch responsive to said excitation coil means and detecting detuning of said reed from said one resonant frequency.

4. A device as defined in claim 3 including relay means and
   a source of electrical potential coupled in series with said magnetic switch, and signal means connecting with said relay means to indicate movement of said member.

5. A device as defined in claim 4 wherein said relay means
   has a response time less than the oscillation buildup time of said reed and said device includes means for momentarily de-energizing said excitation coil means to verify detector operability.

6. A motion detector comprising, a frame, a member movable
   from a netural position relative to said frame, a first detent carried on said movable member, a second detent fixedly secured to said frame and spaced from the first detent in substantially opposed alignment therewith, a reed supported at one end on said frame and extending through the space between the detents, said reed being constrained by said detents only on movement of said member from a neutral position to tune the reed to one resonant frequency, at least the free end portion of said reed being magnetic, a source of alternating current having a frequency substantially half said one resonant frequency of the reed, excitation coil means coupled to said source of alternating current and arranged adjacent the free end of said reed to induce oscillation thereof at said one resonant frequency, a magnetic switch including contacts responsive to said excitation coil means for actuation, and a magnetic shutter on the free end of said reed projecting laterally therefrom for isolating said magnetic switch from actuation by said excitation coil means in response to oscillation excursion of said reed at said one resonant frequency.

7. A device as defined in claim 6 including relay means and
   a source of electrical potential coupled in series with said magnetic switch, and signal means connected with said relay means to indicate movement of said member.

References Cited by the Examiner

UNITED STATES PATENTS

| 996,713 | 7/1911 | Hartmann-Kempf | 200—91 |
| 2,260,210 | 10/1941 | Bourne | 73—70—2 X |
| 2,399,297 | 4/1946 | Rudolph | 73—70.2 |
| 2,808,581 | 10/1957 | Findlay | 340—244 |
| 2,918,548 | 12/1959 | Buccini | 200—91 |
| 3,185,901 | 5/1965 | Voigt | 317—182 |

FOREIGN PATENTS 548,403    4/1932    Germany.

NEIL C. READ, *Primary Examiner.*

D. K. MYER, *Assistant Examiner.*